United States Patent [19]

Chabal

[11] Patent Number: 4,817,489
[45] Date of Patent: Apr. 4, 1989

[54] TRAINING DEVICE FOR PERCUSSION MUSICIANS

[76] Inventor: Maurice L. Chabal, Les Plaines Gagnieres F., 30160 Besseges, France

[21] Appl. No.: 87,503

[22] PCT Filed: Nov. 26, 1986

[86] PCT No.: PCT/FR86/00405
 § 371 Date: Aug. 27, 1987
 § 102(e) Date: Aug. 27, 1987

[87] PCT Pub. No.: WO87/03410
 PCT Pub. Date: Jun. 4, 1987

[30] Foreign Application Priority Data

Nov. 27, 1985 [FR] France ............................. 85/17643

[51] Int. Cl.⁴ ............................................. G10D 13/02
[52] U.S. Cl. ..................................... 84/411 P; 84/453
[58] Field of Search ................. 84/411 R, 411 P, 453, 84/465, 281, 283

[56] References Cited

U.S. PATENT DOCUMENTS

| 2,524,518 | 10/1950 | D'Arcy | 84/411 R |
| 3,443,471 | 5/1969 | Di Muzio | 84/465 |
| 3,604,307 | 9/1971 | Vono | 84/465 |

FOREIGN PATENT DOCUMENTS

| 3100676 | 4/1982 | Fed. Rep. of Germany | 84/283 |
| 591004 | 6/1925 | France | 84/283 |

Primary Examiner—L. T. Hix
Assistant Examiner—Brian W. Brown
Attorney, Agent, or Firm—Lee C. Robinson, Jr.

[57] ABSTRACT

A training and device for a percussion instrument comprising a guide means of at least one ramp forming a slide guide attached to the percussion instrument. The ramp guides the musician's sticks in a sliding movement to and from the diaphragm of the percussion instrument while freeing the musician from constant attention to the position of the sticks.

8 Claims, 4 Drawing Sheets

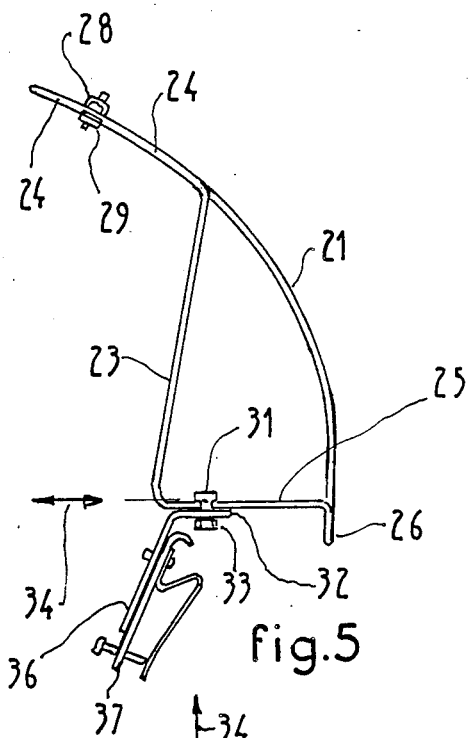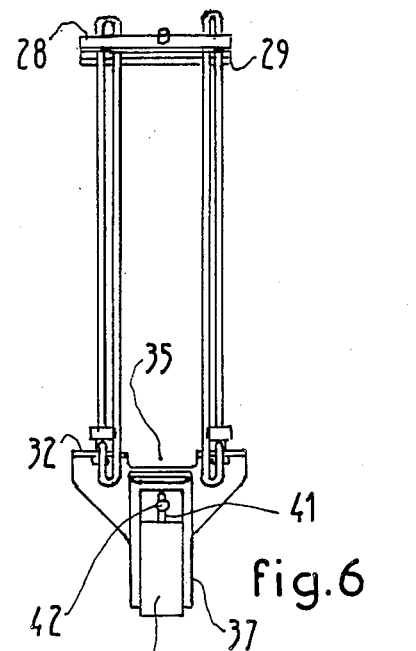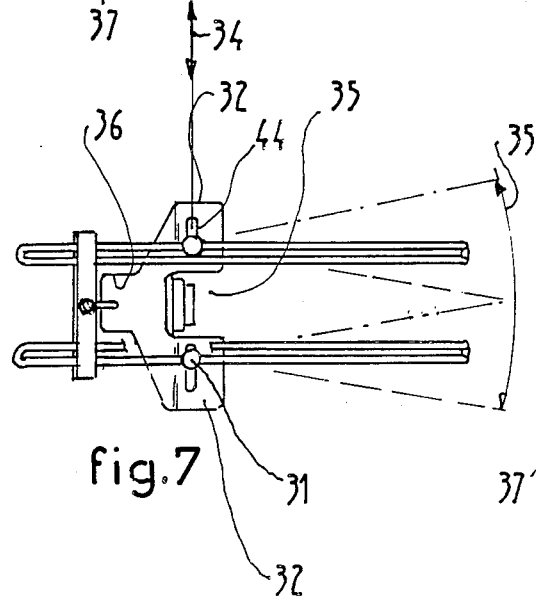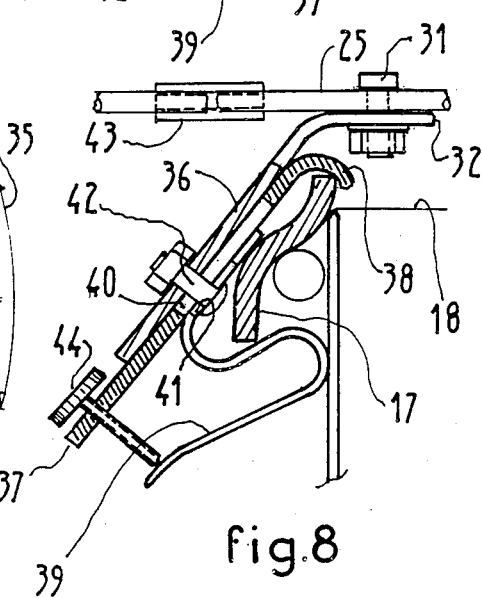

TRAINING DEVICE FOR PERCUSSION MUSICIANS

The present invention relates to a device seeking to facilitate the training of percussion musicians, and also to devices for applying said process.

It may be recalled that percussion musicians are usually trained in the movement of beating the diaphragm of the instrument in a free movement of the wrist; this movement consists in opening and closing an angle of a maximumum of 80° between the diaphragm of the instrument and the flank of the stick; the stick is gripped at one end in the hand, with the wrist as its axis of rotation; this movement must be made in an approximately vertical plane. The freedom of the movement results in inaccurate movements and laborious progress, further increased by the physical difficulties of the musician, who has to pay constant attention to his movements.

It has been attempted to obviate the abovementioned difficulties by means of devices intended to immobilize the forearm by the use of splints (U.S. Pat. No. 3,604,307), or to limit the movability of the stick by articulating it to a fixed support (U.S. Pat. No. 3,443,471). These devices have provided only a partial solution of the problems of training a musician, and they entail beating conditions too different from free beating.

The aim of the present invention is to provide means assisting the training of a percussion player, which entail a minimum of constraint in the player's movements, while at the same time freeing him from the need for constant attention to the position of the stick.

The process of the invention consists in general in guiding the player's sticks in a sliding movement along one or more ramps suitably disposed above the diaphragm of the instrument.

According to the present invention, furthermore, a device forming a guide means for the sticks of a percussion player in his beating movements is characterized in general in that it is composed of at least one ramp forming a slide guide and of means for holding said ramp at least in a substantially vertical position above the diaphragm.

The means for holding the ramp or ramps, or slide guide or slide guides, above the diaphragm may consist either of a tripod standing on the ground or of a fastening means in form of a clip attachable to the periphery of the instrument.

The holding and/or fastening means may be common to a pair of ramps or slide guides, or be intended for a single ramp or slide guide.

In a first embodiment the device forming the object of the invention is characterized in that it comprises two slide guides disposed in a substantially vertical plane at right angles to the plane of the diaphragm of the percussion instrument. The user supports the right-hand stick against the right-hand slide guide and the left-hand stick against the left-hand slide guide. Through the force of the wrists the sticks are moved downwards and upwards along a rectilinear path dictated by the slide guides. The player imitates perfectly his future movement by beating the instrument on each downward movement of the stick.

In one form of construction of the device the bottom end of the slide guides is disposed a short distance, usually a few millimeters, from the diaphragm of the percussion instrument, in order not to distort the sound.

In another embodiment the slide guides are mounted on a support structure.

In yet another embodiment the slide guides are mounted on a swivel joint so as to be adjustable in position, said swivel joints being in turn fastened to the support structure.

In a different device according to this embodiment the swivel joints are selflocking, so that after adjustment of the slide guides they will be immovable relative to the support.

In another embodiment the support structure is composed of an articulated tube having a certain flexibility, thus enabling each individual player to adjust the desired distance between the slide guides an to position the sticks on the inside or the outside of the guide device.

In another embodiment the support structure is fastened by clipping to the musical instrument. The clip is fixed on the rim serving to tension the diaphragm of the instrument.

In another embodiment the support structure is mounted on a tripod or the like, such as is well known to instrumentalists, particularly to percussion players.

In a second, preferred embodiment each slide guide is composed of a pair of ramps parallel to and disposed at a distance from one another slightly greater than the diameter of the stick; in this embodiment each ramp, which forms the curved portion of a loop having approximately the shape of a quarter-circle, is fixed adjustably, in respect of direction and translatory movement, on a plate which in turn is mounted for vertical sliding on a clip adapted to be fixed to the rim of the instrument.

The present invention will be better understood and details relating to it will emerge from the description given below of different embodiments, with reference to the accompanying drawings, in which:

FIGS. 5, 6 and 7 illustrate in side elevation, front elevation and plan respectively one of the slide guides of the preceding figure, and FIG. 8 shows on a larger scale the fastening and adjustment means of the second embodiment.

Figure 1:
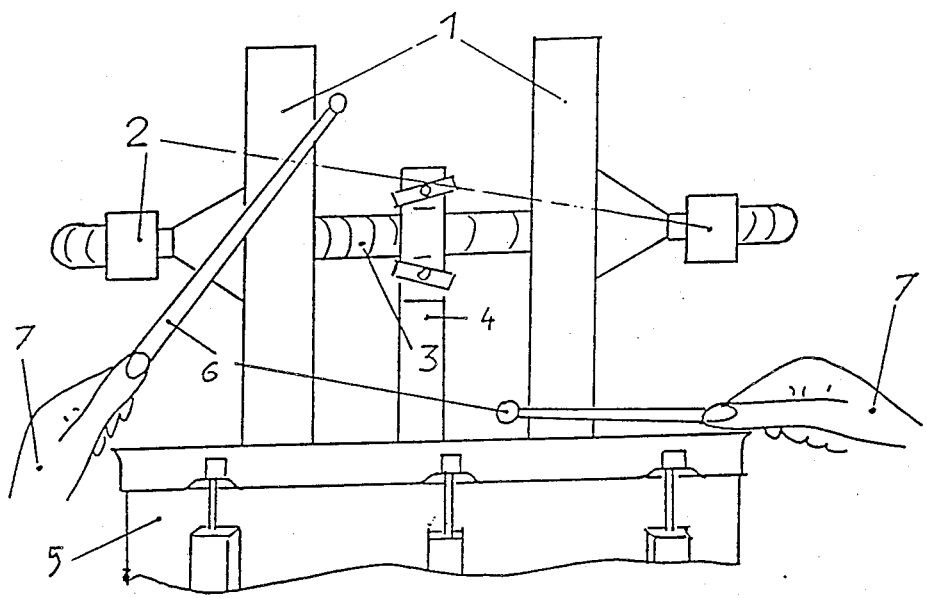
FIG. 1 shows the tripod mounted device for internal use.

In FIG. 1 the device for internal use shown comprises two slide guides 1 whose height is of the order of thirty centimeters and which are mounted on selflocking swivel joints 2 fastened to a support 3 of deformable tube, fixed on a tripod 4 above a percussion instrument 5. The sticks 6 slide along the guides through the force of the wrists 7.

Figure 2:
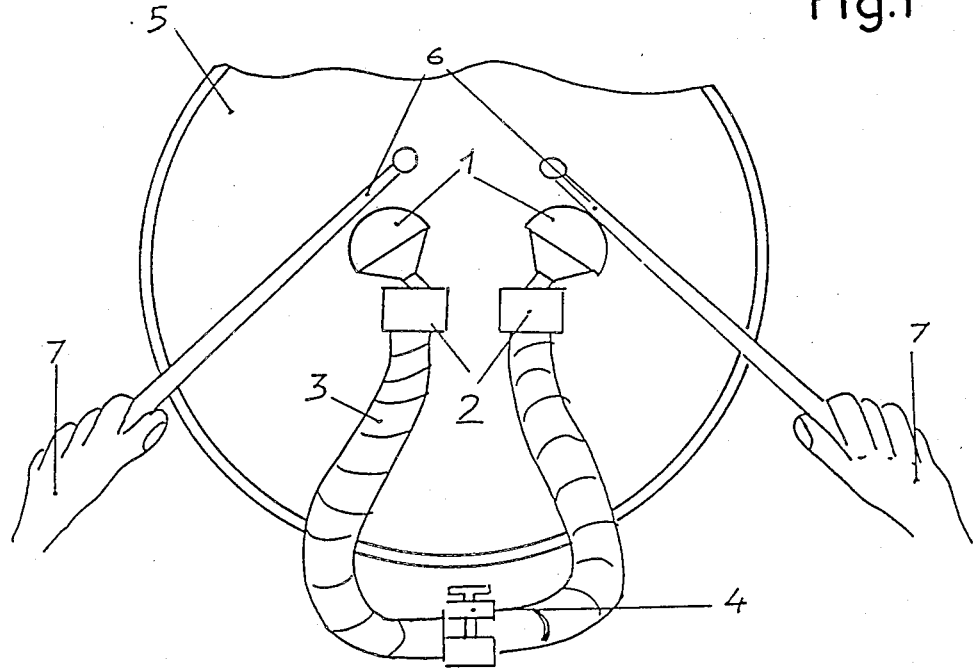
FIG. 2 is a top plan view of the tripod mounted guide system for external use.

The device for external use shown in FIG. 2 comprises two slide guides 1 whose radius amount to fifteen millimeters, with a height of thirty centimeters and which are mounted on selflocking swivel joints fastened to a support 3 of rigid flexible tube fixed on a tripod 4 above a percussion instrument 5. The sticks 6 slide on the slide guides through the force of the wrists 7.

Figure 3:
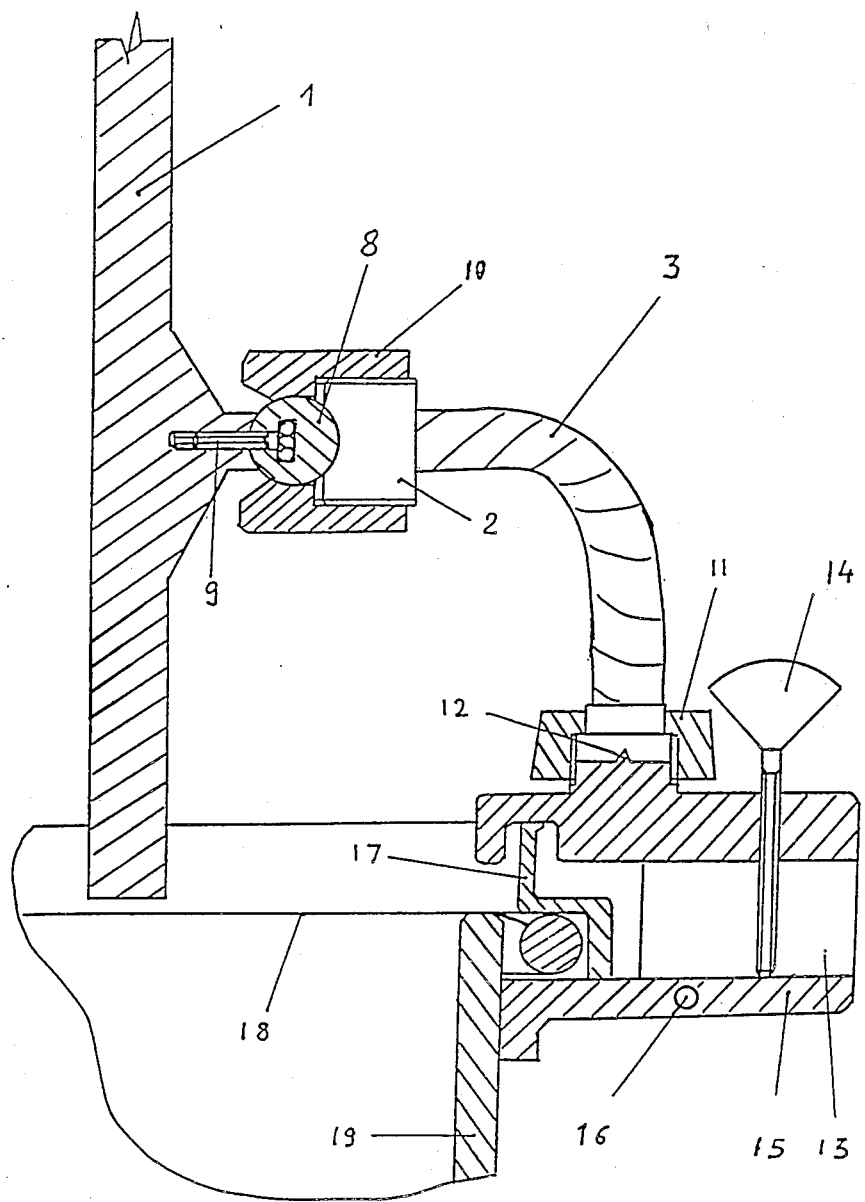
FIG. 3 shows in section the device clipped to the musical instrument.
Figure 4:
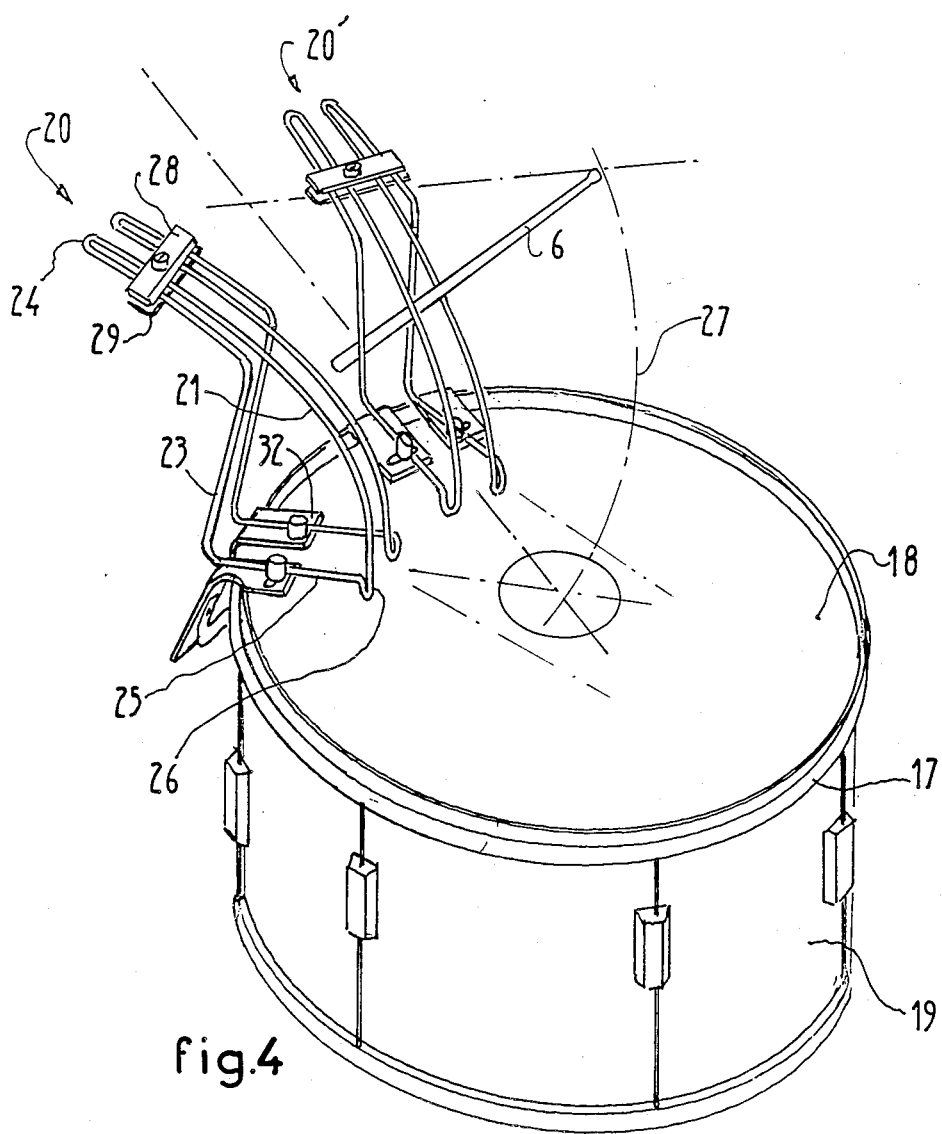
FIG. 4 shows in perspective a device according to the second embodiment.

The device shown in FIG. 3 comprises a slide guide 1 mounted on a selflocking swivel joint 2 consisting of a ball 8 and adapted to be dismantled by means of a screw and nut system 9 clamped between the support 3 and a locks crew 10. The support 3 is held locked on the clip system by means of a screw 11 and is secured against rotation by a snug 12. the frame 13 gives the member 15 rotational mobility with the aid of a pin 16. Clamping on the rim 17 tensioning the diaphragm 18 of the instrument 19 is achieved by means of a lock screw 14.

In FIGS. 4 to 7 guide means for a stick 6 consist of a pair of slide guides 20, 20', each of which is composed of a preferably metallic rod formed into a closed loop having substantially the shape of a quarter-circle with its radii; the parts 21 and 22 having substantially the shape of a quarter-circle form guide ramps between which the stick can move; the part 23 forming a vertical radius of the loop rejoins the top end of the part having the shape of a quarter-circle via a hairpin-shaped part 24; the part 25 forming a horizontal radius of the loop rejoins the bottom end of the part having the shape of a quarter-circle via a short hairpin-shaped part 26. Each loop is shaped symmetrically to the other loop in relation to the plane 27 in which the stick moves.

The hairpin-shaped parts 24 are clamped by a pair of bars 28, 29. The purpose of this pair of the bars is on the one hand to maintain the spacing of the two ramps, but also to serve as a top stop for the stick; the bottom bar 28 will advantageously be covered with felt or elastic material in order to damp the shock of the stick.

The horizontal branch 25 of each loop passes through the perforated head of a threaded bolt 31 bolted on a plate 32; the slackening of the nut 33 makes it possible either to move the part 25 along its ais (arrow 34), or to pivot it in its plane (arrow 35). The bolt 31 can in addition be moved laterally in an aperture 44 by way of which is passes through the plate.

The plate 32 is a Y-shaped member cut out 35 and having an inclined extension 36, to the bottom face of which is fixed a clip intended to engage under the rim 38 of the percussion instrument (drum).

In FIG. 8 it can be seen that the extension 36 is bolted to a strip 37 shaped as a hook 38 at the top, while the same bolt 42 serves to fix a leaf spring 39 under the strip 37; an aperture 40 in the strip makes it possible to slide the extension 36 obliquely and to adjust the height of the slide guides fixed to the plates 32, while an aperture 41 in the spring make it possible to adjust the position of the latter along the strip 37; the adjustment of the spring allows optimization of the clamping of the edge forming the tensioning rim 17 of the drum between the spring and the hook 38; a screw 44 can apply pressure to the end of the spring in order to increase the clamping action.

Still referring to FIG. 8, 43 designates a sleeve adapted to be screwed onto the threaded end of the loop 25, thus enabling it to form a closed loop. It is also proposed to cover those parts 21 of the ramps which have the shape of an arc of a circle with a small tube, for example of flexible polyvinyl chloride.

A simplified training means, which is not shown in the drawings, could consist of a simple board in which two substantially vertical rods are mounted. It must also be understood that although particular embodiments of the invention have been described and illustrated, the scope of the invention is not limited to these embodiments, but that it extends to any means making it possible to guide the sticks above the drum by a sliding movement.

I claim:
1. A training device for training a percussion musician in the use of a percussion instrument having sticks and a diaphragm, the device comprising:
   a percussion instrument having sticks and a diaphragm; and
   means of limiting the movement of the sticks,
   said means being composed of at least one slide guide disposed in a substantially vertical plane above said diaphragm and along which said sticks freely slide.
2. A training device as claimed in claim 1, in which each slide guide comprises of a single ramp.
3. A device as claimed in claim 1, in which each slide guide consists of a pair of ramps parallel and spaced apart by a distance slightly greater than each diameter of the stick.
4. A device as claimed in claim 1, which in addition is provided with holding means for fastening the slide guide to the instrument.
5. A device as claimed in claim 1, in which each slide guide is substantially rectilinear.
6. A device as claimed in claim 3, in which each ramp of the pair of ramps forming a slide guide is roughly the shape of a quarter-circle.
7. A device as claimed in claim 6, which further comprises a plate and clip assembly for fastening said ramps to the instrument.
8. A device as claimed in claim 6, which further comprises a pair of bars for holding the ramps of each slide guide spaced apart and for serving as a top stop for the sticks.

* * * * *